O. J. ISRAEL.
SPOOL HOLDER OR CASE.
APPLICATION FILED MAY 27, 1913.
1,079,556.
Patented Nov. 25, 1913.
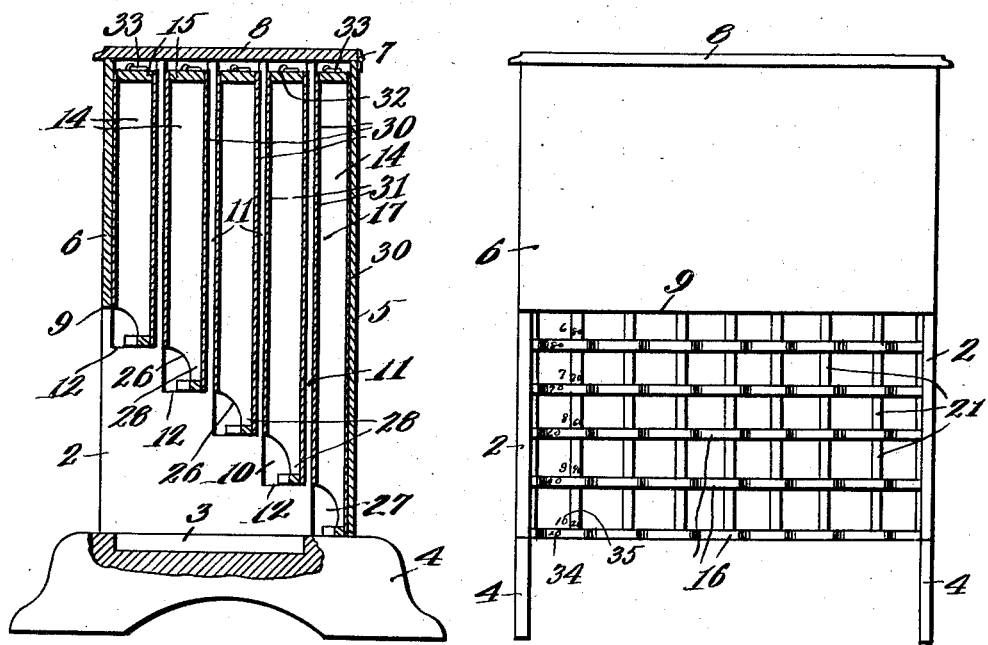
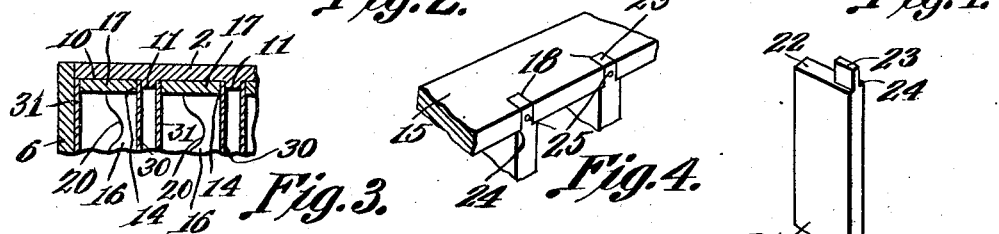
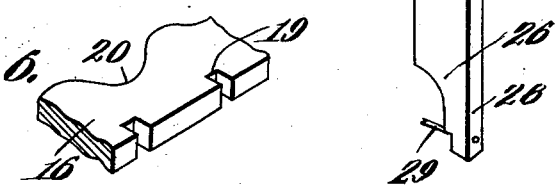
Witnesses
Oscar J. Israel,
Inventor
by C. A. Snow & Co.
Attorneys

UNITED STATES PATENT OFFICE.

OSCAR J. ISRAEL, OF CHARITON, IOWA.

SPOOL HOLDER OR CASE.

1,079,556.   Specification of Letters Patent.   Patented Nov. 25, 1913.

Application filed May 27, 1913. Serial No. 770,244.

*To all whom it may concern:*

Be it known that I, OSCAR J. ISRAEL, a citizen of the United States, residing at Chariton, in the county of Lucas and State of Iowa, have invented a new and useful Spool Holder or Case, of which the following is a specification.

The device forming the subject matter of this application is adapted to be employed in stores and elsewhere, for the purpose of retaining, in a position accessible to both the buyer and the seller, spools of thread and like articles.

One object of the present invention is to provide a device of this type from which the spool holding elements may be moved individually.

Another object of the invention is to provide a device of the type indicated which will be strong in construction, and at the same time serve to support the spool holders, at their lower ends in vertically spaced relation, from the front of the case toward the rear thereof, thereby permitting the spools in the several holders to be displayed to advantage.

Another object of the invention is to provide a spool holding frame of unusually strong construction.

It is within the scope of the invention to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings:—Figure 1 shows the invention in front elevation; Fig. 2 is a vertical transverse section; Fig. 3 is a fragmental horizontal section; Fig. 4 is a perspective showing the upper end of a portion of one of the spool holding frames; Fig. 5 is a perspective of one of the partitions, a portion thereof being broken away; Fig. 6 is a fragmental perspective of the bottom portion of the spool holding frame.

In carrying out the invention there is provided a case 1, comprising side walls 2, mortised and tenoned at their lower ends as indicated at 3, into base strips 4. The side walls 2 are connected at their rear edges by a back 5 which is co-extensive in length with the heights of the side walls 2. The side walls 2 are connected at their forward edges by a front 6. Hinged as indicated at 7 to the upper edge of the back 5 is a lid 8. The front 6 terminates at its lower edge 9 at a point approximately midway between the lid 8 and the upper edges of the base strips 4. The inner faces of the side walls 2 are plowed longitudinally or otherwise constructed, so as to form guideways 10 vertically disposed, and to form spacing ribs 11, between the guide ways 10. The guide ways 10 are of successively increasing lengths from the front of the case 1 toward the rear thereof, to define vertically spaced shoulders 12 at the lower ends of the guide ways. A plurality of spool holding frames 14 are mounted to slide vertically in the guide ways 10. The spool holding frames 14 are spaced against contact with each other by the ribs 11, the several spool holding frames 14 being supported by the shoulders 12 thereby to hold the lower end of each spool holding frame above the lower end of the next spool holding frame to the rear. Owing to this construction, the lowermost spools in each frame, are visible, when all of the frames are resting upon the shoulders 12.

The frame 14 comprises a top 15 and a bottom 16 and end walls 17. In the rear edge of the top 15 of each frame there is a notch 18, and vertically alined with the notch 18 is a notch 19, formed in the bottom 16. A plurality of partitions 21 are provided. The upper ends 22 of the partitions 21 abut against the lower face of the top 15 and each partition 21 terminates at its rear and at its upper end in an upstanding finger 23 which is received in one of the notches 18. The finger 23 is reduced in thickness so as to form a shoulder 24, bearing against the under face of the top 15. A securing element 25 passes through the finger 23 and enters the top 15 at the base of the notch 18 therein. As indicated at 26, each partition 21 is cut away in its forward edge and at its lower end, so that when all of the partitions are in place in the spool holding frame, a spool disclosing opening 27 exists in the frame, from one side of the frame to the other. The cutting away of the partition indicated at 26 results in the formation of a reduced end 28 which is received in the notch 19 of the bottom 16. A securing element 29 passes through the end 28 and enters the bottom 16 at the base of the notch 19 therein.

If desired, the bottom 16 of each frame may be provided with a notch 20, located between each pair of partitions 21, the notch 20 permitting the finger of the operator to be placed in engagement with the lowermost spool. Each spool holding frame comprises a back plate 30 and a front plate 31. The back plate 30 is co-extensive in length with the height of the spool holding frame, but the front plate 31 terminates at the upper end of the cut away portion 26, so that the lower end of the spool may not be hidden by the plate. The end walls 17 may be connected with the top 15 and with the bottom 16 as hereinbefore described in connection with the partition 21. All of the tops 15 of the several spool holding frames lie in a common horizontal plane and are disposed in relatively close relation to the hingedly mounted lid 8. The tops 15 of the spool holding frames are provided with pivotally mounted rings 33 or like finger engaging elements, whereby any one spool holding frame may be removed readily, independently of the other frames.

At the back of each notch 20 may be inscribed a number 34 indicating the number or grade of the thread carried by the spools which are located between any one pair of partitions 21. Other numerals 35 may be inscribed upon any suitable portion of the spool holding frame, for the purpose of indicating the vertical capacity of the frame.

From the foregoing it will be observed that any one spool holding frame may be removed independently of the other spool holding frame. In devices of this type, considerable difficulty has been experienced hitherto in making the frames sufficiently rigid to withstand the hammering action of the spools, when the lowermost spool is withdrawn. Although the hammering action of the superposed spools is not great, it is sufficient, after a comparatively brief period of use, to dislodge the bottom 16 and to disorganize the spool holding frame otherwise. In the present device, the spool holding frames as clearly shown in Figs. 4, 5 and 6 are so fashioned that the desired strength will be obtained.

In practical operation, the spools are set up endwise between the partitions 21 and are supported against downward movement by the bottom 16. The finger of the operator may be placed in the notch for the purpose of removing the lowermost spool, the superposed spools being thereupon permitted to drop downwardly upon the bottom 16. Owing to the fact that the shoulders 12 are spaced vertically from each other, the lowermost spools, in all of the frames are at all times accessible and visible. Should any one spool holding frame become broken through long continued use, it is not necessary to tear down the entire structure, any one spool holding frame being individually removable.

Although the spool holding frames are of different lengths, the tops 32 of the frames are held in a common horizontal plane, and all of the frames are easily accessible for removal, through the instrumentality of the rings 33.

It is to be observed that the construction of the device is such that it may be filled with spools very rapidly, the construction being such that the spools may be removed readily and without difficulty. It is to be noted particularly that the bottom 16 is notched as indicated at 20, so that the bottom, adjacent the base of the notch 20 is narrower than the diameter of the narrowest spool. As a consequence, the spool projects beyond the base of the notch 20. In filling the cabinet, the face of the lowermost spool is therefore exposed and may be engaged by the top of another spool which is being inserted into the structure, all of the spools in any one row thus being lifted, to permit the insertion of a new spool. The foregoing feature is of importance not only while the cabinet is being filled but also when, as is frequently the case, a customer calls for an exchange.

Having thus described the invention, what is claimed is:—

1. In a spool holder, a case comprising side walls having guide ways and ribs between the guide ways, the guide ways being of successively increasing lengths from the front of the case toward the back thereof to define vertically spaced shoulders at the lower ends of the guide ways; and a plurality of individually removable spool holding frames mounted to slide in the guide ways and spaced from each other by the ribs, the spool holding frames being supported by the shoulders, thereby to hold the lower end of each spool holding frame above the lower end of the next spool holding frame to the rear, the spool holding frames being of different lengths and having their tops flush.

2. In a spool holder, a case; and a spool holding frame mounted to slide in the case, the frame comprising a top having notches in its rear edge, a bottom having notches in its rear edge, and partitions; each partition abutting at its upper end against the lower face of the top and having an upstanding finger engaged in a notch of the top, the lower end of each partition being cut away above the bottom to define a spool disclosing opening through the frame from side to side thereof and to define a reduced end at the lower extremity of the partition, the end being received in one notch of the bottom; a securing element passing through the finger into engagement with the top; and a securing element passing through the reduced end of the partition into engagement with the bottom.

In testimony that I claim the foregoing as my own, I have hereto affixed my signature in the presence of two witnesses.

OSCAR J. ISRAEL.

Witnesses:
G. A. PEASLEY,
L. B. GITTINGER.